United States Patent
Santi et al.

(10) Patent No.: US 12,406,158 B1
(45) Date of Patent: Sep. 2, 2025

(54) OFFLINE SELECTION OF OPTIMAL 2D IMAGE FILTERS CHAINS FOR RECOVER DECODABILITY OF DIRECT PART MARKED (DPM) AND POORLY PRINTED LABELS

(71) Applicant: Datalogic IP Tech S.r.l., Calderara di Reno (IT)

(72) Inventors: Stefano Santi, Eugene, OR (US); Lucrezia Paradisi, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 0 days.

(21) Appl. No.: 18/767,715

(22) Filed: Jul. 9, 2024

Related U.S. Application Data

(60) Provisional application No. 63/634,058, filed on Apr. 15, 2024.

(51) Int. Cl.
    *G06K 7/14*     (2006.01)
    *G06T 5/20*     (2006.01)
    *G06T 5/70*     (2024.01)

(52) U.S. Cl.
    CPC .............. *G06K 7/1447* (2013.01); *G06T 5/20* (2013.01); *G06T 5/70* (2024.01); *G06T 2207/20036* (2013.01)

(58) Field of Classification Search
    CPC ............ G06K 7/1447; G06T 5/70; G06T 5/20
    USPC ....................................................... 235/454
    See application file for complete search history.

(56) References Cited

U.S. PATENT DOCUMENTS

| | | | |
|---|---|---|---|
| 2023/0032900 A1* | 2/2023 | Schüler | G06K 7/1443 |
| 2024/0020498 A1* | 1/2024 | Weber | G06K 7/10811 |
| 2024/0265220 A1* | 8/2024 | Lais | G06T 3/4038 |

OTHER PUBLICATIONS

Adaptive Histogram Equalization, Wikipedia.org, accessed at https://en.wikipedia.org/wiki/Adaptive_histogram_equalization on Apr. 11, 2024, 2 pgs.

Anistrophic Diffusion, Wikipedia.org, accessed at https://en.wikipedia.org/wiki/Anisotropic_diffusion on Apr. 11, 2024, 2 pgs.

(Continued)

*Primary Examiner* — Allyson N Trail
(74) *Attorney, Agent, or Firm* — Foley & Lardner LLP

(57) ABSTRACT

A code reader may include a non-transitory memory configured to store multiple image processing filters including at least one pipelined complex image processing filter. An image sensor may be configured to image machine-readable indicia. Processor(s) of the code reader may be configured to perform an automatic setup procedure that captures one or more sample machine-readable indicia. The sample machine-readable indicia may be decoded by utilizing the image processing filters including at least one of the pipelined complex image processing filter(s) determined offline from the code reader. A subset of the image processing filters may be selected based on performance of the image processing filters in decoding the multiple sample machine-readable indicia for use during normal code reading operations of the code reader may be performed. Normal code reading operations may be performed in reading machine-readable indicia using the selected subset of the image processing filters.

20 Claims, 4 Drawing Sheets

(56) References Cited

OTHER PUBLICATIONS

Bilateral Filter, Wikipedia.org, accessed at https://en.wikipedia.org/wiki/Bilateral_filter on Apr. 11, 2024, 2 pgs.
Dilation (Morphology), Wikipedia.org, accessed at https://en.wikipedia.org/wiki/Dilation_(morphology) on Apr. 11, 2024, 2 pgs.
Erosion (Morphology), Wikipedia.org, accessed at https://en.wikipedia.org/wiki/Erosion_(morphology) on Apr. 11, 2024, 2 pgs.
Guided Filter, Wikipedia.org, accessed at https://en.wikipedia.org/wiki/Guided_filter on Apr. 11, 2024, 2 pgs.
Median Filter, Wikipedia.org, accessed at https://en.wikipedia.org/wiki/Median_filter on Apr. 11, 2024, 2 pgs.

* cited by examiner

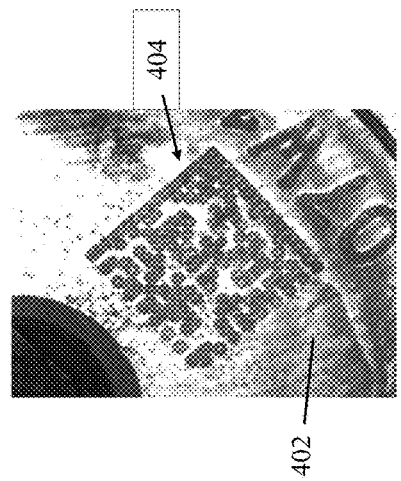
FIG. 3A / FIG. 3B
FIG. 4A / FIG. 4B

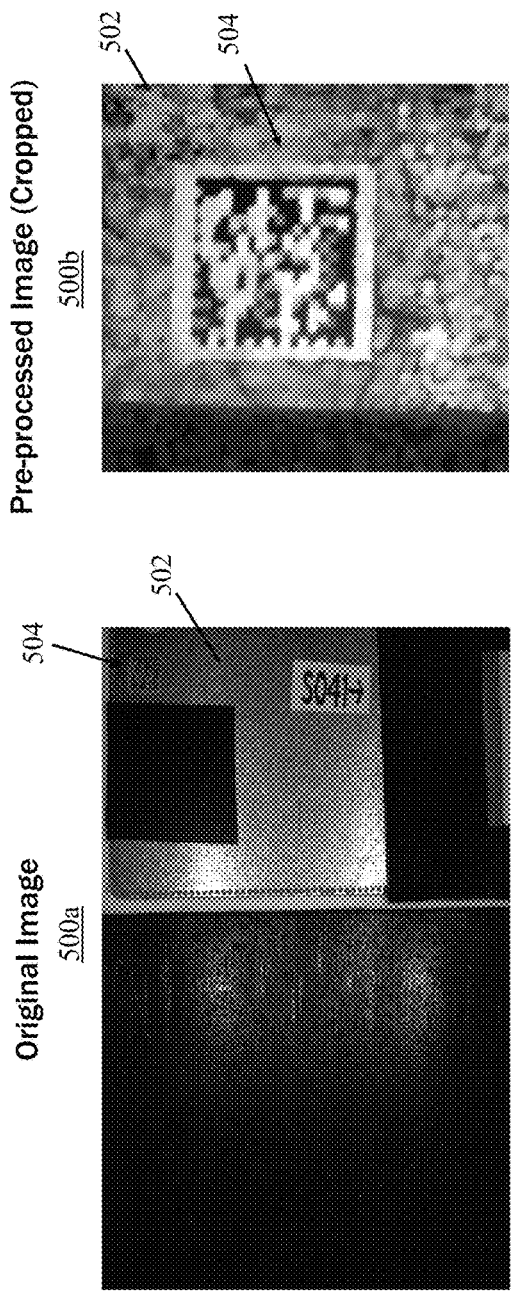
FIG. 5A
FIG. 5B
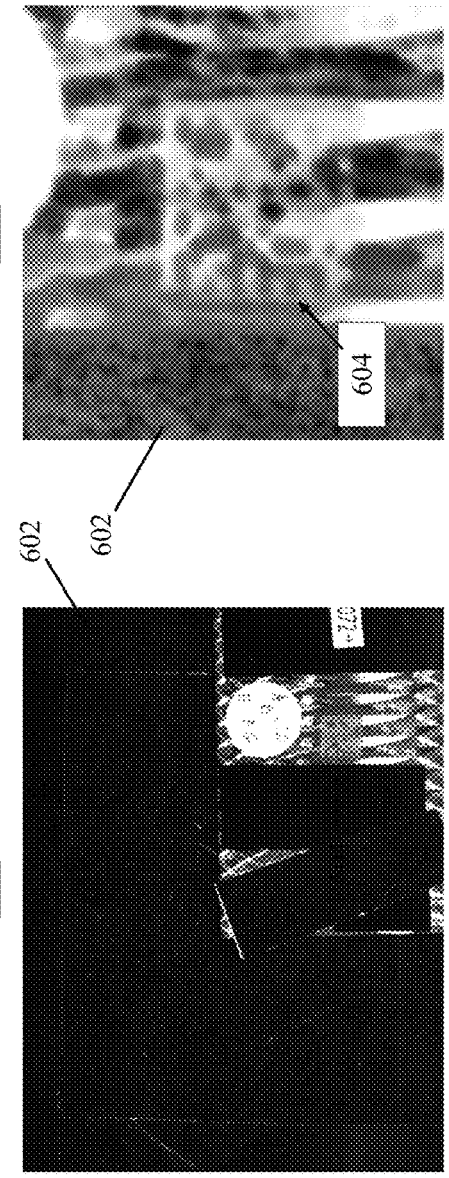
FIG. 6A
FIG. 6B

OFFLINE SELECTION OF OPTIMAL 2D IMAGE FILTERS CHAINS FOR RECOVER DECODABILITY OF DIRECT PART MARKED (DPM) AND POORLY PRINTED LABELS

CROSS-REFERENCE TO RELATED APPLICATIONS

This application claims the benefit of and priority to U.S. Provisional Patent Application having Ser. No. 63/634,058, filed on Apr. 15, 2024; the contents of which are hereby incorporated by reference in their entirety.

BACKGROUND

For direct part marked (DPM) reading systems and other code reader systems (code readers), image pre-processing systems utilize automatic setup procedures with single stage simple filters. TABLE I below represents currently available pre-processing 2D image processing filters for code readers, which represent the state of the art of image pre-processing in DPM and other code reader applications.

TABLE I

| Function type | Description | Conventional Available - iterators - chainable | Proprietary Available - iterators - chainable |
|---|---|---|---|
| Erode | morphological expansion of lower grayscale values with 3 × 3 kernel | yes - 1 . . . 10 - yes | yes - 1, 2, 3 - yes |
| Dilate | morphological expansion of higher grayscale values with 3 × 3 kernel | yes - 1 . . . 10 - yes | yes - 1, 2, 3 - yes |
| Open | erosion followed by dilation | yes - 1 . . . 10 - yes | yes - 1, 2, 3 - yes |
| Close | dilation followed by erosion | yes - 1 . . . 10 - yes | yes - 1, 2, 3 - yes |
| Smooth | Low pass filter with binomial 5 × 5 kernel | no | yes - 1 - yes |
| Sharpen | high pass filter with 3 × 3 kernel (see Wikipedia ®) | yes - 1 . . . 10 - yes | yes - 1 - yes |
| Median | edge preserving non-linear filter with 3 × 3 kernel (see Wikipedia) | yes - 1 . . . 10 - yes | no |
| Pyramids Low | low pass filtering with 3 × 3 Gaussian kernel followed by 2× X-Y subsampling | unknown (not present in the filters options. Maybe in decoder) | yes - 1, 2, 3, 4 - no |
| Pyramids Medium | low pass filtering with 5 × 5 Gaussian kernel followed by 2× X-Y subsampling. Default (when pyramids enabled) | unknown (not present in the filters options. Maybe in decoder) | yes - 1, 2, 3, 4 - no |
| Pyramids High | low pass filtering with 7 × 7 Gaussian kernel followed by 2× X-Y subsampling | unknown (not present in the filters options. Maybe in decoder) | yes - 1, 2, 3, 4 - no |

"Iterators" represents the number of times that the same 2D image processing or image filter can be applied to the image, while "chainable" tells whether the filter output of one image filter can be used as an input for another image filter.

The (speculated, but likely) reason for this very limited image filter offering is that, during the automatic setup procedure, a lot of possible scanner configurations have to be explored in order to find at least one image filter with a high decoding rate. More complex image processing filters, such as combined pipelined image processing filters, where a filter output of image filter N is fed to an input of the image filter (N+1), causes a search space to grow exponentially and the search method when performing an automatic setup procedure by a code reader takes a long time to explore the possibilities within a reasonable time (e.g., less than 30 seconds), thus resulting in inefficient and complicated setups that users of the DPM and other code reading systems are unwilling to tolerate.

The state of the art is basically represented by a trade-off between the filters offering, which are basic and not pipelined filters, and the speed of convergence of the automatic setup procedure. As such, there is a need to provide for more sophisticated filter capabilities without becoming a burden on users in setting up DPM and other code reading systems.

SUMMARY

The principles provided herein overcome the shortcomings of limited image processing filtering of code readers due to burdensome and lengthy setups while greatly improving decoding rates of most code reading applications (e.g., direct part marking (DPM) reading, barcode reading, quick reference (QR) code reading, etc.) by performing offline selection of a limited number of image processing filters that include pipelined complex image processing filters. The principles also improve applications where barcode labels are poorly printed and hard to read as a result of availability of the pipelined complex image processing filters. Further-more, as a second property, the proposed method and system reduces time to converge to a good scanner configuration when associated to an online (i.e., on the device) automatic setup procedure. In an embodiment, the system and method utilizes an offline learning of pipelined complex image processing filters based on decodability metrics computed on a massive training set (representing a wide variety of machine-readable indicia (e.g., DPM applications)) captured by a code reader having common hardware and/or software components as others on which the offline learning using pipelined complex image processing filters are performed by using offline learning of pipelined complex image processing filters overcome the shortcoming of conventional learning of code readers as state-of-the-art solutions are restricted to online learning of simple, non-pipelined filters. As a result, work when performing an online automatic setup of a code reader is simplified and may be performed by non-technical personnel, thereby providing a list of most promising pipelined pre-processing operators or image processing filters to reduce setup time.

One embodiment of a code reader may include a non-transitory memory configured to store multiple image processing filters including at least one pipelined complex image processing filter. An image sensor may be configured to image machine-readable indicia. At least one processor may be in communication with the non-transitory memory and image sensor, and be configured to perform an automatic setup procedure. The automatic setup procedure may be configured to capture a plurality of sample machine-readable indicia. The sample machine-readable indicia may be decoded by utilizing a multiple of the image processing filters including at least one of the pipelined complex image processing filter(s) determined offline from the code reader. A subset of the image processing filters may be selected based on performance of the image processing filters in decoding the multiple sample machine-readable indicia for use during normal code reading operations of the code reader may be performed. Normal code reading operations may be performed in reading machine-readable indicia using the selected subset of the image processing filters.

One embodiment of a method of manufacturing a code reader may include decoding, by at least one processor offline from the code reader, multiple sample imaged machine-readable indicia using multiple pipelined complex image processing filters. Pipelined complex image processing filters with a highest number of decodes of the imaged machine-readable indicia may be selected. The selected pipelined complex image processing filters may be added or appended to a subset list of pipelined complex image processing filters until a predetermined number of the machine-readable indicia are decoded (e.g., all or a certain percentage) by the pipelined complex image processing filters. The subset list of pipelined complex image processing filters may be stored in a non-transitory memory of the code reader.

One embodiment of a method of setting up a code reader may include, in response to an automated setup procedure being initiated, at least one sample machine-readable indicia may be imaged. Image data representative of the at least one imaged machine-readable indicia may be generated. A set of image processing filters including at least one pipelined complex image processing filter may be accessed in a non-transitory memory of the code reader. At least one pipelined complex image processing filter may be selected for use during reading operations of the code reader by image processing the generated image data representative of the machine-readable indicia(s) using each of the accessed image processing filters. Each of the machine-readable indicia may be decoded after being image processed. At least one of the image processing filters may be selected based on performance of each of the image processing filters decoding the machine-readable indicia(s). The selected at least one image processing filter may be established for use during code reading operations of the code reader.

BRIEF DESCRIPTION OF THE DRAWINGS

Illustrative embodiments of the present invention are described in detail below with reference to the attached drawing figures, which are incorporated by reference herein and wherein:

FIGS. 3A, 3B, 4A, 4B, 5A, 5B, 6A, and 6B are illustrative images in which captured images have machine-readable indicia, in this case DPM codes, that are initially unable to be decodable become decodable by using pipelined complex image processing filters from a "BestFilterList" stored on a code reader or other device utilizing the principles described herein.

DETAILED DESCRIPTION

Figure 1:
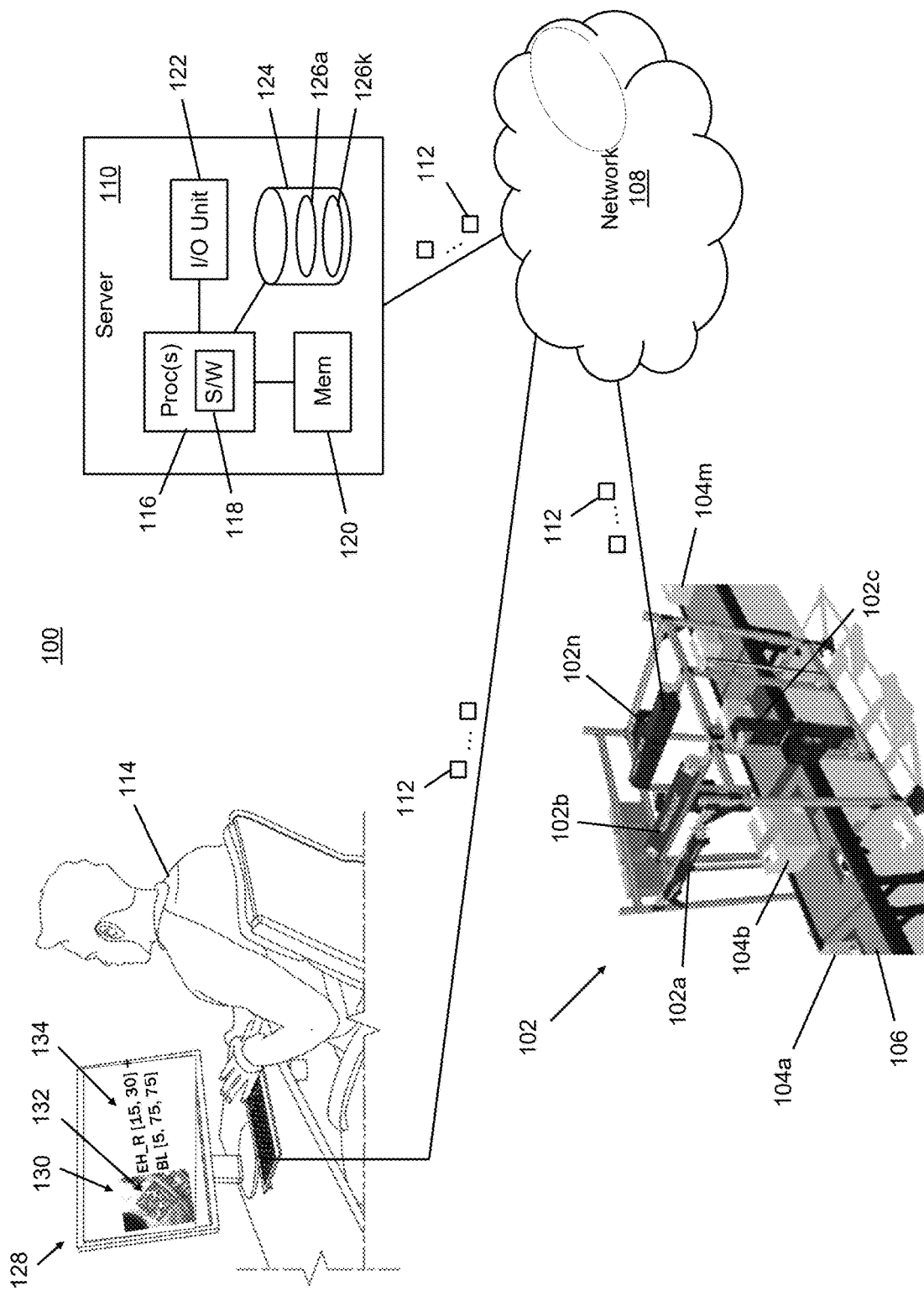
FIG. 1 is an illustration of an illustrative system environment in which a code readers are deployed to image objects, such as packages, including machine-readable indicia are affixed thereto and the code readers are configured with one or more pipelined filters through an offline training process to be utilized in an online automatic setup procedure.

With regard to FIG. 1, an illustration of an illustrative system environment 100 in which a code readers 102*a*-102*n* (collectively 102) are deployed to image objects 104*a*-104*m* (collectively 104), such as packages, including machine-readable indicia (e.g., barcodes, QR codes, direct-part marking (DPM) codes, etc.) are affixed thereto and the code readers 102 are configured with one or more pipelined complex image processing filters through an offline training process is shown. If each of the code readers 102 are the same model (e.g., with the same imaging components), then the pipelined complex image processing filters may be the same, but if the cameras are of different models (e.g., with different imaging components), then the pipelined complex image processing filters may be different, as further described hereinbelow.

As shown, the code readers 102 may be disposed above and to the side of a conveyer 106 that moves the objects 104. It should be understood that the code readers 102 may be disposed and oriented in almost any location to image machine-readable indicia of any type and for any purpose. For example, one or more code readers may be disposed in a manufacturing facility, such as after a DPM system that marks metal parts or parts of other material(s), where the DPM codes may be used for identifying the parts in later manufacturing processes and the quality of the DPM codes have to be above a certain quality to avoid misreads.

As shown, the code readers 102 may be in communication with a communications network 108, such as a local area network (LAN) and/or wide area network (WAN), that may enable the code readers to read and communicate captured data to or have data communicated from a server 110 in the form of data packets 112, wherein the captured data may include image data, decoding data, etc. The data packets 112 may be communicated using any communications protocol, as understood in the art. In an embodiment, the code readers 102 may be pre-configured with one or more pipelined image processing filters by a manufacturer, as further described herein, or have the pipelined image processing filters dynamically selected and/or populated by the server 110 or a user 114 who has access to the data communicated in the data packets 112 from the code readers 102.

The server 110 may include one or more processors 116 that execute software 118 for automatically or semi-automatically determining a set of pipelined image processing filters that are determined to best decode machine-readable codes from a dataset captured by a code reader having common components as code readers having the pipelined image processing filters. Because the code readers 102 are to be positioned in specific ways (e.g., top-down, side view, etc.) and with different lighting conditions, the pipelined image processing filters selected by an automatic setup procedure may or may not be the same for each of the code readers 102. Image data from one or more of the code readers 102 may be communicated to the server, and the software 118 may automatically or semi-automatically perform image processing on image data communicated thereto by the code reader(s) 102 for selection of best pipelined complex image processing filters, as further described herein.

The processor(s) 116 may be in communication with a non-transitory memory 120, input/output (I/O) unit 122, and storage unit 124 configured to store one or more data repositories 126a-126k (collectively 126). The memory 120 and/or data repositor(ies) 126 may store each of the image filters and perform pipelining thereof in an offline manner (e.g., on a computing system external from the code reader) to determine which pipelined complex image processing filters are best to perform image processing to improve quality of an imaged machine-readable indicia (e.g., DPM code) prior to decoding to result in the highest percentage of decoding by the code readers 102. Results may be stored in the data repositor(ies) 126, and control or other data (e.g., selected image processing filters) may be communicated to the code readers 102 for configuration of the pipelined image processing filters. The same or similar offline testing process of the dataset may be performed on a computing device, such as a computer 128 on which the user 114 is working.

As shown, an image 130 including a code 132 may be displayed and the user 114 may automatically, semi-automatically, and/or manually test image processing filters 134 on a test dataset that may include sample images of machine-readable indicia that are difficult to read due to poor illumination or otherwise. In an alternative embodiment, rather than communicating the image data 130 via the network 108, one or more of the code readers 102 may be directly communicated with a computer, such as the computer 128. For example, the computer 128 may be a portable computer and connected directly to the code reader(s) 102 to determine a subset (e.g., 24) pipelined image filters with which to configure the code reader(s) 102. As further described herein, after the configuration of the pipelined image processing filter(s) on the code reader(s) 102, an automated setup process may be performed by the code reader(s) 102 for selection of one or more (e.g., 3) pipelined image filters of the subset of pipelined image filters prior to normal operation thereby.

In general, the principles described herein provide for a method and system for offline learning (i.e., performed on a remote host (e.g., server 110), as opposed to being performed on a device, such as a code reader) of a list of pipelined pre-processing operators or pipelined complex image processing filters that transform a grayscale image captured by a 2D image sensor into another 2D grayscale image. When a proper image processing filter is selected, among a limited learnt options within the list of image processing filters stored on a code reader, the transformed grayscale may have a higher probability to be decoded by the legacy decoding methods or other third-party decoding library. Utilizing the principles provided herein, the decoding rate on DPM codes and, more generally, poorly printed barcode labels, is greatly improved. Moreover, the processes described herein may be utilized to decode barcode labels that are difficult to decode, such as DPM applications or when labels are poorly printed (e.g., ink spread, ink drag, etc.). It should be understood that the principles described herein may be utilized for any type of code reading or other object identification.

As a second and desirable side effect, the possibly associated online (i.e., on the device) automatic setup procedure may converge much faster because exploration space dimensionality has been reduced offline by selection of the most successful filter combinations. In other words, a lot of filter options may be avoided during the online search because filters that did not prove as effective as the selected filters during the offline learning process may be avoided.

The principles provided herein may utilize an offline learning of pipelined (or cascaded) complex filters, and the output of this learning process may be a limited selection of pipelined complex filters that improve quality of images being processed by the pipelined complex filters. The selection may be determined based on the maximum number of successful decodes in one or more representative datasets of images, where the legacy approach currently does not perform competitively. Moreover, because the training set may be produced by a code reader with common components to other code readers that have common components (e.g., same make and model), the selected pipelined complex image processing filters as determined during an offline training process and be applied to the other code readers with common components. The selected filters may be a limited number (e.g., 24 filters) that are determined offline to be most effective in decoding machine-readable indicia based on the ability to decode the training set on that code reader.

In order to determine a limited selection of pipelined complex filters offline, which may be used for an online automatic setup procedure, the following elements may be utilized:

1. A dataset of images that is sufficiently large, where a broad variety of DPM and other machine-readable indicia use cases are adequately represented. In particular, different printing techniques, such as dot peening, laser etching, chemical etching on a wide variety of substrates, such as plastic, metal, glass with the different associated textures may be included in the dataset. A large dataset may include about 3000 or more images including over 100 DPM samples captured with a barcode reader from a variety of different positions, distances, and acquisition conditions (e.g., exposure, illumination type, ambient light, etc.). Despite the limited number of images, a dataset of this size and diversity well represents most code reading applications and include a large variety of machine-readable indicia samples that are captured at different random distances and orientations.

2. A list of filters and related configurations. A wide range of filters may be utilized for supporting imaging of DPM and other machine-readable indicia. It should be understood that additional and/or alternative filters that have the same, similar, or different image processing filter properties may be utilized. Below is a sample list of filters that may be used:
   a. Morphological filters with small (e.g., circular 3×3), medium (e.g., square 3×3) and large (e.g., circular 5×5) kernels. This category may include erosion, dilation, open and close (and no morphological filter, as well). With these settings, the morphological filters may have 13 possible combinations;
   b. Smoothing filters with small, medium, and large kernels: binomial, bilateral, guided, median, and anisotropic diffusion (and no smoothing filter). With these settings, the smoothing filters may have 16 possible combinations;
   c. Enhancement filters with three configurations at different scales (small, medium and large): contrast limited adaptive histogram equalization (CLAHE), emphasize (and no enhancement). With these settings, the enhancement filters may have seven possible combinations. In some embodiments, one or more neural network filters may be employed—one for each category of filters (e.g., enhancement, morphological, smoothing).

3. At least one selection criteria may be utilized: by applying operations research techniques, it is possible to identify an optimal set of filters to retrieve the maximum number of decodes. For example, a minimum list of pipelined filters, which may include all the decodable images over the dataset, is a good candidate as selection criteria. An alternate option may include selecting a first N filters with the highest overall decoding rate, or some weighted combination of the two selections criteria. In an embodiment, the criteria may be based on a weighted sum of number of decodes.

With a naïve brute force search, a search space may provide for (13*16*7)=1,456 different combinations of pipelined filters, which is generally prohibitive for an online automatic setup procedure to converge in commercially reasonable time. In should be understood that alternative number of combination of pipelined filters may also be possible, but would still be prohibitive for an online automatic setup procedure to converge in a commercially reasonable time. In fact, the online algorithm may explore a space of parameters (e.g., exposure time, analog gain, illumination type, etc.) of the acquisition system (e.g., code reader) and a decoding method configuration on top of the filter selection. With this, a search space would grow significantly and the possible configurations of pipelined filters to be explored would be in the several hundred of thousands, which are impractical for an online learning process during automatic setup of a device.

Figure 2:
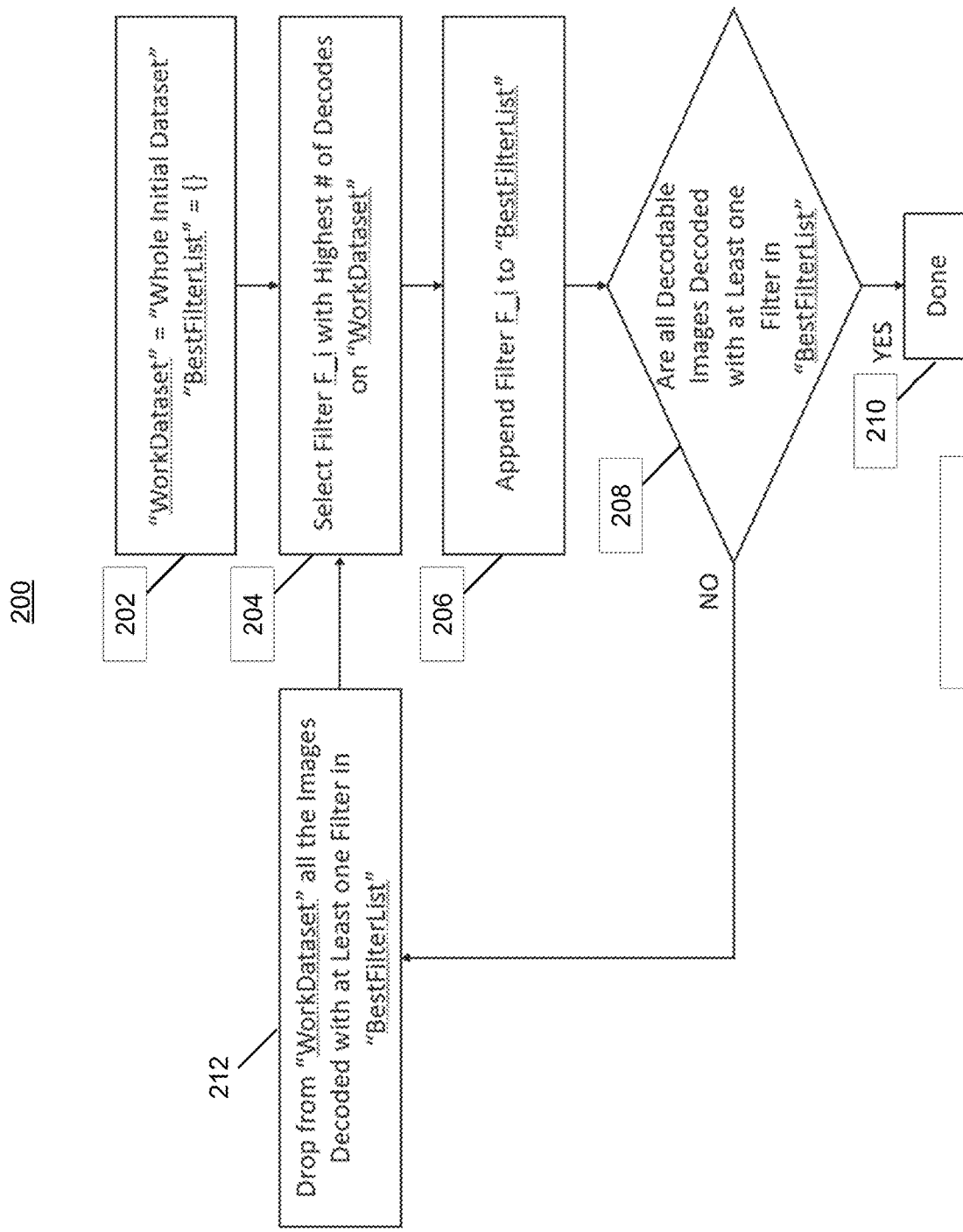
FIG. 2 is a flow diagram of an illustrative process for performing an offline selection of best image filters for a code reader.

With regard to FIG. 2, a flowchart of an illustrative process 200 for performing an offline selection of best image filters for a code reader is shown. The process 200 for performing filter selection may be initialized at a beginning of a selection process at step 202, where a "WorkDataset," which may serve as an input to the process 200, may be initialized to a data frame (e.g., a matrix of non-homogeneous data) with images of the dataset. In an embodiment, the dataset may be formed of one image per row (e.g., upwards of 3,000 rows or more). Each column may encode decode results for a given filter, labeling the column with "0" for encoding failure and "1" for encoding success. Each slot in the data frame may represent the decode results on a given image (row index) when a given filter is applied to that image (column index). A simplified example of the data frame, based on a smaller dataset, may be utilized. As part of an initialization process, the list of the selected filters "BestFilterList" may be initialized to an empty set. At step 204, a first step of selection may be a "greedy" selection of a filter with a highest number of decodes in the dataset (i.e., the filter that has the most number of decodes of images of the test dataset of images). The selected filter may be added to a list of selected filters at step 206, where the selected filter may be appended to the "BestFilterList." If, at a current iteration as determined at step 208, all (or a predetermined majority) of the decodable images can be decoded with the list of filters, the selection process may be determined to be complete and the process 200 is done and may exit at step 210. Otherwise, the process 200 may iterate using an updated version of the dataset, where the images that can be decoded with the list of filters in the "BestFilterlist" may be removed from the "WorkDataset" list of sample images inclusive of machine-readable indicia.

Several variations for performing the offline filter selection may be applied to the process 200 while maintaining the base underlying idea. For example:

1. On at least some iterations, the "WorkDataset" may be modified by removing the columns of the best filter (and not the rows as in the process 200 described hereinabove). Such removal of columns may lead to a less "greedy" selection method with possibly better performance of online inference during an automatic setup procedure.

2. In an embodiment, and as previously suggested, the selection may be terminated when the number of images decoded with at least one filter in "BestFilterList" is within a certain marginal threshold from a total number of decodable images, or a minimum number of images decoded exclusively by a certain filter. Such termination may reduce the number of selected filters with minimal, but still negative, effects on the overall decoding performance and allow for a faster convergence of an automatic setup procedure.

3. The filter selection criteria may be based on a weighted sum of number of decodes on "WorkDataset" and number of decodes on the "Whole Initial Dataset," as provided in step 202. The filter selection criteria may favor the high decode performance filters and partially compensate for occasional volatile performance to the decoding process.

4. The filter selection process may include not only a number of decodes, but also include a decodability metric that denotes a degree of difficulty with which the code was read. Filters with higher values of decodability indexes generally result in higher image quality.

5. In an embodiment, the filter selection process 200 may include preprocessing and time to decode based on frame rate. The time to decode may establish a time limit as to how long decoding of a machine-readable indicia takes after being processed by one or more image processing filters.

Filters with fewer than two decodes may be excluded to limit the number of selected filters (basically variation item number 2 above may be applied) and a key-value dictionary used in the process 200 may have a filter type as a key and a differential number of decodes on the dataset (i.e., images that are decoded by the given filter, but not by any of the filters preceding the given filter in the list) as value.

Below is a brief description of filter notations in TABLE II below:

a. Morphological filters are erosion ("ER"), dilation ("DL"), open ("OP") and close ("CL").

b. Each filter may have kernel circular ("ELL"), cross-shaped ("CROSS") or square ("RECT"). A morphological filter is not applied when not present in the list.

c. Adaptive contrast enhancement (CLAHE) is labeled "EU_R" and the adaptive contrast enhancement comes with few different filter configuration parameters: [15, 5], [15,30], and [25,5].

d. Edge preserving smoothing filters: a bilateral filter is labeled "BL," a guided filter "GU," and a median filter "MS."

e. "Origin" is a label for original images without any type of pre-processing.

TABLE II below is a set of selected pipelined complex image processing filters (listed on a "BestFilterList") that are selected from a "Whole Initial Dataset" (e.g., 1456 filters) by utilizing the offline selection process 200 of FIG. 2.

TABLE II

Results of the Offline Filter Selection ("BestFilterList")

| Filter Number | Filter |
|---|---|
| 1 | <\| ['EH_R', [15, 30], 'BL', [5, 75, 75]] -> 1948 \|> |
| 2 | <\| origin -> 205 \|> |
| 3 | <\| ['ER', ['ELL', 3], 'EH_R', [25, 5], 'BL', [5, 125, 75]] -> 108 \|> |
| 4 | <\| ['DL', ['RECT', 3], 'EH_R', [15, 5], 'BL', [5, 125, 75]] -> 36 \|> |
| 5 | <\| ['ER', ['ELL', 3], 'EH_R', [15, 30], 'BL', [5, 125, 75]] -> 35 \|> |
| 6 | <\| ['ER', ['CROSS', 5], 'EH_R', [15, 30], 'GU', [1, 75]] -> 20 \|> |
| 7 | <\| ['EH_R', [5, 25]] -> 17 \|> |
| 8 | <\| ['OP', ['ELL', 3]] -> 12 \|> |
| 9 | <\| ['OP', ['RECT', 3], 'EH_R', [25, 5], 'BL', [5, 125, 75]] -> 10 \|> |
| 10 | <\| ['CL', ['RECT', 5], 'EH_R', [15, 30], 'BL', [5, 125, 75]] -> 8 \|> |
| 11 | <\| ['ER', ['CROSS', 5], 'EH_R', [25, 5], 'MS', [5]] -> 8 \|> |
| 12 | <\| ['ER', ['ELL', 3]] -> 8 \|> |
| 13 | <\| ['BL', [5, 15, 75]] -> 8 \|> |
| 14 | <\| ['ER', ['RECT', 3], 'EH_R', [15, 30], 'BL', [5, 125, 75]] -> 6 \|> |
| 15 | <\| ['BL', [5, 125, 75]] -> 6 \|> |
| 16 | <\| ['CL', ['RECT', 3], 'EH_R', [25, 5], 'BL', [5, 125, 75]] -> 4 \|> |
| 17 | <\| ['ER', ['RECT', 3], 'EH_R', [15, 30], 'GU', [1, 75]] -> 3 \|> |
| 18 | <\| ['DL', ['RECT', 3], 'EH_R', [15, 30], 'MS', [3]] -> 3 \|> |
| 19 | <\| ['EH_R', [15, 80], 'BL', [5, 75, 75]] -> 3 \|> |
| 20 | <\| ['GU', [1, 75]] -> 3 \|> |
| 21 | <\| ['CL', ['ELL', 3], 'EH_R', [15, 30], 'MS', [5]] -> 2 \|> |
| 22 | <\| ['ER', ['ELL', 3], 'EH_R', [15, 30], 'MS', [5]] -> 2 \|> |
| 23 | <\| ['DL', ['ELL', 3], 'BL', [5, 15, 75]] -> 2 \|> |
| 24 | <\| ['ER', ['RECT', 3]] -> 2 \|> |

As a comparison, the decoding rates under different conditions are provided below:

a. The current state of the art without pipelined filters has a decoding rate on the dataset of 56.8% (e.g., 1695 images decoded out of 2980).

b. The decoding rate of the sample or test dataset when at least one pipelined complex image processing filter out of the 1456 different combinations described above may decode a given image is 83.3% (2483 images decoded out of 2980). Note that, by construction of a robust sample dataset (e.g., images with poor quality, machine-readable indicia of different types), nearly 20% of the images may be captured with a poor configuration of the acquisition system, so most of the non-decoded images are actually non-decodable because of the image quality is too poor (e.g., massive reflections, dark, noisy, etc.).

c. The decoding rate of the dataset, when at least one pipelined filter out of the 24 different combinations listed in TABLE II as selected using the process 200, is 82.5% (2459 images decoded out of 2980).

d. In an embodiment, a minimum number of pipelined filters that guarantees decoding all of the decodable images in the dataset with at least one pipelined filter is 48. In other words, there are additional 24 pipelined filters that exclusively decode a single image. These filters are not present in the selection of TABLE II because of a "less of 2 decodes" criteria that has been applied. As previously described, the process 200 may be "relaxed" or less stringent to remove the "less of 2 decodes" criteria or increase the number of decodes to make the criteria more stringent.

The result of this thorough experiment confirms the hypothesis that the process 200 greatly improves the decoding rate in DPM and other code reading applications (decoding rate has been increased from 56.8% of the legacy methods to 82.5% when using a very limited selection of pipelined filters with the process 200). Furthermore, as a second desirable property, the process 200 reduces time to converge to a good scanner configuration when utilized by an online (i.e., on the device) automatic setup procedure, thereby reducing the number of filters to be tested from over one thousand to a couple dozen, as provided in TABLE II. It should be understood that the number of filters may be higher or lower depending on the criteria applied in the process 200. To reiterate, the pipelined complex image processing filters, such as those listed in TABLE II, may be hardcoded or otherwise stored in a code reader. Thereafter, an automatic setup procedure, which may be manually triggered, may be performed to select one or a subset of filters (e.g., three filters) from the set of filters that are able to decode the most number of codes (e.g., test codes in a sample dataset). Although each of the code readers may have the same set of pipelined complex image processing filters, each of the code readers may select the same or different subset of filters (e.g., "BestFilterList") from the set of filters during the automatic setup procedure depending which of the subset of filters are able to decode test codes or machine-readable indicia during the automatic setup procedure.

With regard to FIGS. 3A, 3B, 4A, 4B, 5A, 5B, 6A, and 6B, illustrative images in which captured images have machine-readable indicia, in this case DPM codes, that are initially unable to be decodable become decodable by using pipelined complex image processing filters from a "BestFilterList" provided in TABLE II hereinabove are shown. In operation, a code reader or other device may select one or more of the pipelined complex image processing filters during an automatic setup procedure that are able to decode machine-readable indicia. Thereafter, during operation, the selected pipelined complex image processing filters (e.g., three filters) may be utilized in attempting to perform decoding of machine-readable indicia or codes, in these cases DPM codes, captured in the images by the reader.

With regard to FIGS. 3A and 3B, an original image 300a and pre-processed image 300b inclusive of a material 302 on which a machine-readable indicia 304 is applied are shown. The piece of material 302 may be a metal plate or other material on which the machine-readable indicia 304, in this case a DPM code, is applied (e.g., imprinted). The piece of material 302 is shown to have an offset position in the image 300a and poor lighting quality applied to the machine-readable indicia 304. Because the lighting is poor, the machine-readable indicia 304 is faint on a bottom portion (i.e., towards the bottom of the image 300a), and shadowed at the top (i.e., towards the top of the image 300a). Utilizing conventional simple filters, the machine-readable indicia 304 is unable to be decoded. However, as shown in the pre-processed image 300b, which is cropped, shows the machine-readable indicia 304 that has been processed using a pipelined complex image processing filter, in this case filter number 5 of TABLE II (<|['ER', ['ELL', 3], 'EH_R', [15, 30], 'BL', [5, 125, 75]]→35|>). As a result of the pipelined complex image processing filtering, the machine-readable indicia 304 is able to be decoded.

With regard to FIGS. 4A and 4B, an original image 400a and pre-processed image 400b inclusive of an identifier tag 402 in the form of a circular piece of metal on which a machine-readable indicia 404 is applied are shown. The identifier tag 402 may be affixed to a surface of a piece of metal or other material 406, such as a part of a machine (e.g., automobile, paving machine, manufacturing equipment, etc.). As shown, the identifier tag 402 and machine-readable indicia 404 have a bright reflection therefrom, which makes decoding the machine-readable indicia 404 difficult without the aid of an image filter. The filter, in this case, may be filter number 12 of TABLE II (i.e., <| ['ER', ['ELL', 3]]→8|>). As shown in FIG. 4B, the image 400*b* has an enhanced image of the machine-readable indicia 404, which is decodable as a result.

With regard to FIGS. 5A and 5B, an original image 500*a* and pre-processed image 500*b* inclusive of piece of material 502, such as a piece of metal, on which a machine-readable indicia 504 is applied are shown. The material 502 may be part of a machine (e.g., automobile, paving machine, manufacturing equipment, etc.). As shown, the material 502 and machine-readable indicia 504 are poorly illuminated, which makes decoding the machine-readable indicia 504 difficult without the aid of a filter. The filter, in this case, is filter number 3 of TABLE II (i.e., <| ['ER', ['ELL', 3], 'EH_R', [25, 5], 'BL', [5, 125, 75]]→108|>). As shown in FIG. 5B, the image 500*b* has an enhanced image of the machine-readable indicia 504, which is decodable as a result using filter number 3.

With regard to FIGS. 6A and 6B, an original image 600*a* and pre-processed image 600*b* inclusive of piece of material 602, such as a piece of metal, on which a machine-readable indicia 604 is applied are shown. In this case, the material 602 may have a pattern 606 defined thereon and on which the machine-readable indicia is applied. It should be understood that the machine-readable indicia 604 may be applied to the material 602 or applied to another piece of material (e.g., metal, plastic, etc.) and affixed with an adhesive (e.g., epoxy, glue, solder, etc.) or otherwise to the material 602. The material 602 may be part of a machine (e.g., automobile, paving machine, manufacturing equipment, etc.). As shown, the material 602 and machine-readable indicia 604 are poorly illuminated and the pattern makes decoding the machine-readable indicia 604 difficult to identify and decode without the aid of a pipelined complex image processing filter. The filter, in this case, is also filter number 3 of TABLE II (i.e., <|['ER', ['ELL', 3], 'EH_R', [25, 5], 'BL', [5, 125, 75]]→108|>). As shown in FIG. 6B, the image 600*b* has an enhanced image of the machine-readable indicia 604, which is decodable as a result using filter number 3.

One embodiment of a code reader may include a non-transitory memory configured to store multiple image processing filters including at least one pipelined complex image processing filter. An image sensor may be configured to image machine-readable indicia. At least one processor may be in communication with the non-transitory memory and image sensor, and be configured to perform an automatic setup procedure. The automatic setup procedure may be configured to capture a plurality of sample machine-readable indicia. The sample machine-readable indicia may be decoded by utilizing a multiple of the image processing filters including at least one of the pipelined complex image processing filter(s). Selection of a subset of the image processing filters based on performance of the image processing filters in decoding the multiple sample machine-readable indicia for use during normal code reading operations of the code reader may be performed. Normal code reading operations in reading machine-readable indicia using the selected subset of the image processing filters may be performed.

The pipelined complex image processing filter(s) may be preselected from amongst a list of pipelined complex image processing filters using a larger set of sample machine readable indicia than the plurality of sample machine-readable indicia. In an embodiment, the image processing filter(s) are all pipelined complex image processing filters. The processor(s), in selecting a subset of image processing filters, may be configured to stop selecting a subset of image processing filters when each of the sample machine-readable indicia have been decoded.

The subset of image processing filters may be a maximum of three image processing filters. The processor(s) may further be configured to store the image processing filters as received from an offline learning of pipelined complex image processing filters. The image processing filters may include any of morphological filters, smoothing filters, and enhancement filters.

One embodiment of a method of manufacturing a code reader may include decoding, by at least one processor offline from the code reader, multiple sample imaged machine-readable indicia using multiple pipelined complex image processing filters. Pipelined complex image processing filters with a highest number of decodes of the imaged machine-readable indicia may be selected. The selected pipelined complex image processing filters may be added or appended to a subset list of pipelined complex image processing filters until a predetermined number of the machine-readable indicia are decoded (e.g., all or a certain percentage) by the pipelined complex image processing filters. The subset list of pipelined complex image processing filters may be stored in a non-transitory memory of the code reader.

Decoding multiple sample imaged machine-readable indicia may include decoding multiple sample imaged machine-readable indicia with at least a portion being non-decodable by non-pipelined complex image processing filters. Decoding multiple sample imaged machine-readable indicia may further include using multiple non-pipeline complex image processing filters, selecting at least one non-pipelined complex image processing filters with a highest number of decodes that are higher than pipelined complex image processing filters, and adding the selected non-pipelined complex image processing filter(s) to the subset list. Storing the subset list of pipelined complex image processing filters may include storing the selected non-pipelined complex image processing filter(s) on the subset list.

A sample data set may be formed by imaging multiple machine-readable indicia of disparate machine-readable indicia types. The subset list of pipeline complex image processing filters may be stored in a non-transitory memory of other code readers of the same make and model as the code reader. In an embodiment, the selected pipelined complex image processing filters may be added to a subset list of image processing filters until all of the machine-readable indicia that are decoded by the plurality of pipelined complex image processing filters.

One embodiment of a method of setting up a code reader may include, in response to an automated setup procedure being initiated, at least one sample machine-readable indicia may be imaged. Image data representative of the at least one imaged machine-readable indicia may be generated. A set of image processing filters including at least one pipelined complex image processing filter may be accessed in a non-transitory memory of the code reader. At least one pipelined complex image processing filter may be selected for use during reading operations of the code reader by image processing the generated image data representative of the machine-readable indicia(s) using each of the accessed image processing filters. Each of the machine-readable indicia may be decoded after being image processed. At least one of the image processing filters may be selected based on performance of each of the image processing filters decoding the machine-readable indicia(s). The selected at least one image processing filter may be established for use during code reading operations of the code reader.

A method of selecting optimal image filters for filtering machine-readable indicia for use on an online imaging system may include establishing a plurality of image filters in a data repository. An offline computing device may apply combinations of the image filters to test images of machine-readable indicia. Combinations of image filters that result in decoding the machine-readable indicia of the test images may be identified by the offline computing device. The combinations of image filters that result in the highest probability of decoding the machine-readable indicia may be selected. The selected combinations of image filters may be utilized by the online imaging system.

In an embodiment, applying combinations of image filters may include applying two-dimensional (2D) image filters.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The set of image processing filters that are accessed may be determined offline from the code reader. At least one of the image processing filters may be selected based on performance includes selecting at least one of the image processing filters based on a total number of the at least one machine-readable data able to be decoded by each of a plurality of the image processing filters.

Selecting at least one of the image processing filters based on performance may include selecting at least one of the image processing filters based on speed for decoding the machine-readable indicia(s). In response to the code reader being used to perform code reading, at least one of the selected image processing filter(s) may be used to read machine-readable indicia. Using the selected image processing filter(s) may be used to read machine-readable indicia by successively using each of the selected image processing filter(s) if decoding the machine-readable indicia is not decoded after being image processed by a preceding selected at least one image processing filter. Selecting at least one of the image processing filters may include selecting a maximum of three image processing filters including at least one pipelined complex image processing filter.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise FLASH, SSD (or other permanent storage memory), ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A code reader, comprising:
   a non-transitory memory configured to store a plurality of image processing filters including at least one pipelined complex image processing filter;

an image sensor configured to image machine-readable indicia; and
at least one processor in communication with the non-transitory memory and image sensor, and configured to:
perform an automatic setup procedure configured to:
capture a plurality of sample machine-readable indicia;
decode the sample machine-readable indicia utilizing a plurality of the image processing filters including at least one of the at least one pipelined complex image processing filters;
select a subset of the image processing filters based on performance of the image processing filters in decoding the plurality of sample machine-readable indicia for use during normal code reading operations of the code reader; and
perform normal code reading operations in reading machine-readable indicia using the selected subset of the image processing filters.

2. The code reader according to claim 1, wherein the at least one pipelined complex image processing filters are preselected from amongst a list of pipelined complex image processing filters using a larger set of sample machine readable indicia than the plurality of sample machine-readable indicia.

3. The code reader according to claim 1, wherein the image processing filters are all pipelined complex image processing filters.

4. The code reader according to claim 1, wherein the at least one processor, in selecting a subset of image processing filters, are configured to stop selecting a subset of image processing filters when each of the plurality of sample machine-readable indicia have been decoded.

5. The code reader according to claim 1, wherein the subset of image processing filters are a maximum of three image processing filters.

6. The code reader according to claim 1, wherein the at least one processor is further configured to store the plurality of image processing filters as received from an offline learning of pipelined complex image processing filters.

7. The code reader according to claim 6, wherein the plurality of image processing filters include any of morphological filters, smoothing filters, and enhancement filters.

8. A method of manufacturing a code reader, said method comprising:
decoding, by at least one processor offline from the code reader, a plurality of sample imaged machine-readable indicia using a plurality of pipelined complex image processing filters;
selecting pipelined complex image processing filters with a highest number of decodes of the plurality of imaged machine-readable indicia;
adding the selected pipelined complex image processing filters to a subset list of pipelined complex image processing filters until a predetermined number of the machine-readable indicia are decoded by the plurality of pipelined complex image processing filters; and
storing the subset list of pipelined complex image processing filters in a non-transitory memory of the code reader.

9. The method according to claim 8, wherein decoding a plurality of sample imaged machine-readable indicia includes decoding a plurality of sample imaged machine-readable indicia with at least a portion being non-decodable by non-pipelined complex image processing filters.

10. The method according to claim 8, further comprising:
decoding a plurality of sample imaged machine-readable indicia further includes using a plurality of non-pipeline complex image processing filters;
selecting at least one non-pipelined complex image processing filters with a highest number of decodes that are higher than pipelined complex image processing filters;
adding the selected at least one non-pipelined complex image processing filters to the subset list; and
wherein storing the subset list of pipelined complex image processing filters includes storing the selected at least one non-pipelined complex image processing filters on the subset list.

11. The method according to claim 8, further comprising forming a sample data set by imaging a plurality of machine-readable indicia of disparate machine-readable indicia types.

12. The method according to claim 8, further comprising storing the subset list of pipeline complex image processing filters in a non-transitory memory of a plurality of other code readers of the same make and model as the code reader.

13. The method according to claim 8, wherein adding the selected pipelined complex image processing filters to a subset list of image processing filters until all of the machine-readable indicia that are decoded by the plurality of pipelined complex image processing filters.

14. A method of setting up a code reader, comprising:
in response to an automated setup procedure being initiated:
imaging at least one sample machine-readable indicia;
generating image data representative of the at least one imaged machine-readable indicia;
accessing, in a non-transitory memory of the code reader, a set of image processing filters including at least one pipelined complex image processing filter;
selecting at least one pipelined complex image processing filter for use during reading operations of the code reader by:
image processing the generated image data representative of the at least one machine-readable indicia using each of the accessed image processing filters;
decoding each of the machine-readable indicia after being image processed;
selecting at least one of the image processing filters based on performance of each of the image processing filters decoding the at least one machine-readable indicia; and
establishing the selected at least one image processing filter for use during code reading operations of the code reader.

15. The method according to claim 14, wherein accessing the set of image processing filters includes accessing the set of image processing filters determined offline from the code reader.

16. The method according to claim 14, wherein selecting at least one of the image processing filters based on performance includes selecting at least one of the image processing filters based on a total number of the at least one machine-readable data able to be decoded by each of a plurality of the image processing filters.

17. The method according to claim 14, wherein selecting at least one of the image processing filters based on performance includes selecting at least one of the image processing filters based on speed for decoding the at least one machine-readable indicia.

18. The method according to claim 14, further comprising, in response to the code reader being used to perform code reading, using at least one of the selected at least one image processing filter to read machine-readable indicia.

19. The method according to claim 18, wherein using at least one of the selected at least one image processing filter to read machine-readable indicia includes successively using each of the selected at least one image processing filter if decoding the machine-readable indicia is not decoded after being image processed by a preceding selected at least one image processing filter.

20. The method according to claim 14, wherein selecting at least one of the image processing filters includes selecting a maximum of three image processing filters including at least one pipelined complex image processing filter.

* * * * *